United States Patent
Kashihara et al.

(10) Patent No.: US 10,432,069 B2
(45) Date of Patent: Oct. 1, 2019

(54) CONTROLLER-INTEGRATED ROTARY ELECTRIC MACHINE

(71) Applicant: Mitsubishi Electric Corporation, Tokyo (JP)

(72) Inventors: Toshiaki Kashihara, Tokyo (JP); Yoshinobu Utsumi, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 15/345,649

(22) Filed: Nov. 8, 2016

(65) Prior Publication Data
US 2017/0353084 A1  Dec. 7, 2017

(30) Foreign Application Priority Data
Jun. 6, 2016 (JP) .................................. 2016-112495

(51) Int. Cl.
| H02K 11/33 | (2016.01) |
| H02K 5/24 | (2006.01) |
| H02K 9/22 | (2006.01) |
| H02K 5/22 | (2006.01) |
| H02K 11/04 | (2016.01) |
| H02P 27/06 | (2006.01) |

(52) U.S. Cl.
CPC ............. *H02K 11/33* (2016.01); *H02K 5/225* (2013.01); *H02K 5/24* (2013.01); *H02K 9/22* (2013.01); *H02K 11/048* (2013.01); *H02P 27/06* (2013.01)

(58) Field of Classification Search
CPC ................................ H02K 11/33; H02K 9/22
USPC ................................ 310/64, 68 D; 320/123
See application file for complete search history.

(56) References Cited

U.S. PATENT DOCUMENTS

| 3,922,592 A * | 11/1975 | Quantz | H02J 7/1423 |
| | | | 320/123 |
| 8,339,000 B2 * | 12/2012 | Bradfield | H02K 11/33 |
| | | | 310/68 D |
| 2014/0319939 A1 * | 10/2014 | Yamada | H02K 3/522 |
| | | | 310/52 |

FOREIGN PATENT DOCUMENTS

| JP | 2001-332244 A | 11/2001 |
| JP | 2015-126602 A | 7/2015 |
| JP | 5840282 B1 | 1/2016 |

OTHER PUBLICATIONS

Communication dated Jun. 20, 2017 from the Japanese Patent Office in counterpart application No. 2016-112495.

* cited by examiner

*Primary Examiner* — Terrance L Kenerly
(74) *Attorney, Agent, or Firm* — Sughrue Mion, PLLC; Richard C. Turner

(57) ABSTRACT

The present invention is concerning a controller-integrated rotary electric machine having a power circuit portion provided between an external power source and a stator winding of a rotary electric machine main body, wherein the power circuit portion includes: a positive-side power input/output terminal and a negative-side power input/output terminal that are electrically connected to the external power source; a power module that performs power conversion between the external power source and the stator winding; and a single heat sink that cools the power module, the positive-side power input/output terminal being fixed to the single heat sink via an insulating material, and the negative-side power input/output terminal being fixed directly to the single heat sink.

7 Claims, 9 Drawing Sheets

CONTROLLER-INTEGRATED ROTARY ELECTRIC MACHINE

BACKGROUND OF THE INVENTION

1. Field of the Invention

The present invention relates to a controller-integrated rotary electric machine in which a rotary electric machine and a controller for controlling the rotary electric machine are integrated with each other.

2. Description of the Related Art

A controller-integrated rotary electric machine equipped in a vehicle such as an automobile is provided with a power conversion circuit that performs power conversion between an armature winding of the rotary electric machine and a battery provided outside the rotary electric machine. This power conversion circuit normally has a plurality of power modules containing switching elements configured from semiconductors. The power conversion circuit is operated as an inverter or converter by control of a gate signal applied to each of the gates of these switching elements.

When operating the rotary electric machine as a motor, the power conversion circuit is operated as an inverter. The inverter in this case converts direct current power of the battery into alternating current power and supplies the alternating current power to the armature winding of the rotary electric machine.

Meanwhile, when operating the rotary electric machine as a generator, the power conversion circuit is operated as a converter. The converter in this case converts alternating current power induced by the armature winding of the rotary electric machine into direct current power and supplies the direct current power to the battery.

Such a conventional controller-integrated rotary electric machine with the foregoing configuration is provided with a positive-side power input/output terminal for the armature winding of the rotary electric machine. Furthermore, a negative-side power input/output terminal for the plurality of power modules is electrically connected to a bracket rear made of die-cast aluminum through a heat sink made of die-cast aluminum and is also electrically connected to the negative electrode terminal of the battery by using one end of the bracket rear (see Japanese Patent Application Publication No. 2015-126602, for example).

SUMMARY OF THE INVENTION

Unfortunately, the prior art faces the following problems. The bracket rear made of die-cast aluminum is exposed to the outside in this conventional device, exposing the negative electrode portion as well. Therefore, it is important to improve vibration resistance of the positive-side power input/output terminal and the negative-side power input/output terminal.

The present invention was contrived in order to solve the foregoing problems inherent in conventional rotary electric machines, and an objet thereof is to provide a controller-integrated rotary electric machine capable of ensuring vibration resistance.

A controller-integrated rotary electric machine according to the present invention is a controller-integrated rotary electric machine having a power circuit portion provided between an external power source and a stator winding of a rotary electric machine main body, wherein the power circuit portion includes: a positive-side power input/output terminal and a negative-side power input/output terminal that are electrically connected to the external power source; a power module that is connected to the external power source by the positive-side power input/output terminal and the negative-side power input/output terminal, is also connected to the stator winding, and performs power conversion between the external power source and the stator winding; and a single heat sink that cools the power module, the positive-side power input/output terminal being fixed to the single heat sink via an insulating material, and the negative-side power input/output terminal being fixed directly to the single heat sink.

According to the present invention, the positive-side power input/output terminal and the negative-side power input/output terminal are configured to be fixed to the same single heat sink. Therefore, a controller-integrated rotary electric machine capable of ensuring vibration resistance can be obtained.

DESCRIPTION OF THE PREFERRED EMBODIMENTS

Preferred embodiments of a controller-integrated rotary electric machine according to the present invention are described hereinafter with reference to the drawings.

Embodiment 1

Figure 1:
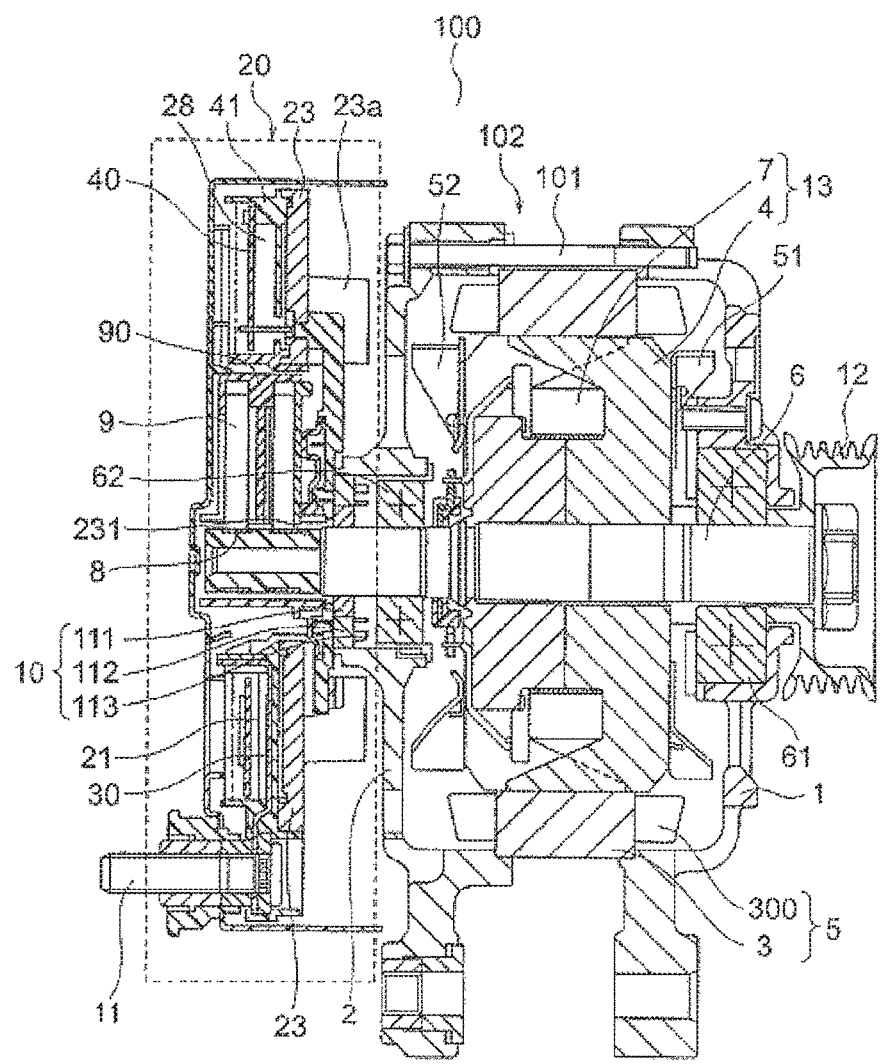
FIG. 1 is a longitudinal cross-sectional diagram of a controller-integrated rotary electric machine according to Embodiment 1 of the present invention.

FIG. 1 is a longitudinal cross-sectional diagram of a controller-integrated rotary electric machine according to Embodiment 1 of the present invention. As shown in FIG. 1, a controller-integrated rotary electric machine 100 for a vehicle is provided with a front bracket 1, a stator core 3 supported by a rear bracket 2, and a rotor core 4 inserted into an internal space of the stator core 3. The rotor core 4 has a plurality of rotor magnetic poles that face an inner peripheral surface of the stator core 3 with a gap therebetween.

A stator winding 300, an armature winding, has a coil piece thereof inserted into a slot of the stator core 3 and is fixed to the stator core 3. In this Embodiment 1, the stator winding 300 has a 6-phase connection.

A rotor winding 7 functioning as a field winding is fixed to the rotor core 4. The stator core 3 and the stator winding 300 configure a stator 5 of a rotary electric machine main body 102, whereas the rotor core 4 and the rotor winding 7 configure a rotor 13 of the rotary electric machine main body 102.

The front bracket 1 and the rear bracket 2 are tightened by a plurality of bolts 101 in a direction in which these brackets approach each other, strongly holding the stator core 3 therebetween.

A rotor shaft 6 passing through the center of the rotor core 4 is supported in a rotatable manner by a front-side bearing 61 supported by the front bracket 1 and a rear-side bearing 62 supported by the rear bracket 2.

A front-side cooling fan 51 and a rear-side cooling fan 52 are fixed to a front-side end surface and a rear-side end surface of the rotor core 4 and rotate together with the rotor core 4, thereby introducing air in from the outside of the front bracket 1 and the rear bracket 2. As a result, the inside of the rotary electric machine main body 102 is cooled.

A pulley 12 is fixed to a front-side end portion of the rotor shaft 6. A transfer belt (not shown) that moves in conjunction with a rotating shaft of an engine is wrapped around the pulley 12. A pair of slip rings 8 fixed to the peripheral surface of the rotor shaft 6 is in sliding contact with a pair of brushes 9 supported by a brush holder 90.

A magnetic pole position detection sensor 10 configured by a synchronous resolver has a sensor rotor 111 fixed to a rear-side end portion of the rotor shaft 6, a sensor stator 112 facing the sensor rotor 111 and fixed to the rear bracket 2, and a sensor winding 113 fixed to the sensor stator 112.

A control circuit board 40 with a control circuit is stored in a board storage case 41 made of resin. The control circuit provided in the control circuit board 40 controls the switching operations of power modules 21 described hereinafter. The board storage case 41 is fixed to an outer surface portion of a heat sink 23.

A power circuit portion 20 is fixed outside the rear bracket 2 and has a power conversion circuit that performs power conversion between the stator winding 300 functioning as an armature winding and a battery, not shown. This power conversion circuit is configured with six power modules 21 described hereinafter and is operated as a 6-phase inverter or a 6-phase converter.

Figure 2:
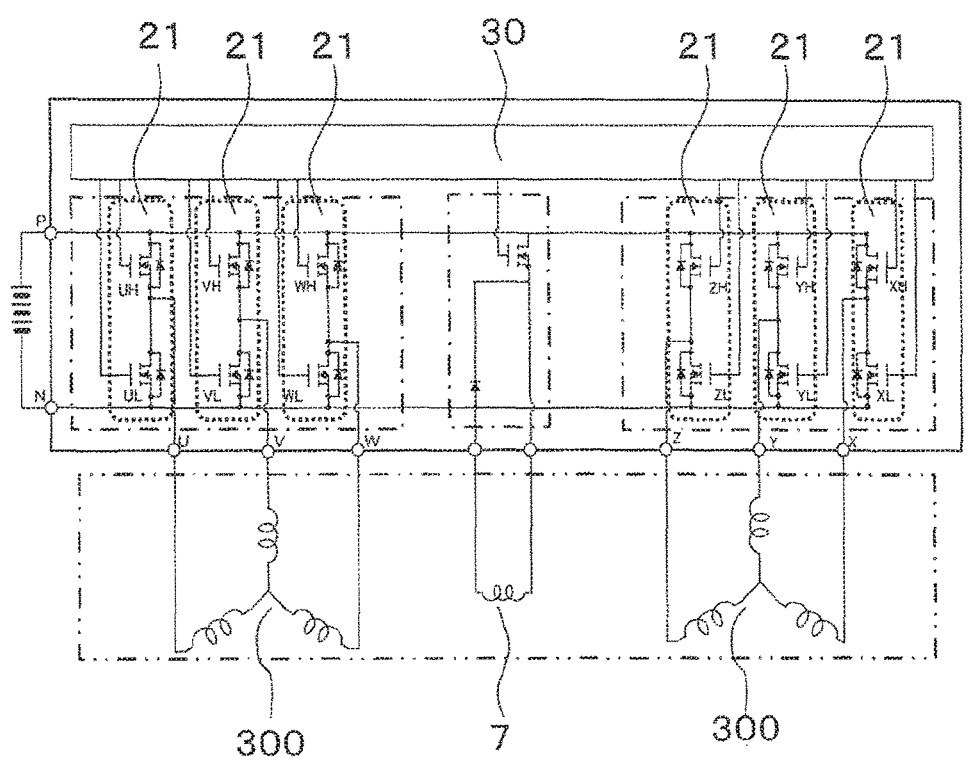
FIG. 2 is a circuit diagram of the controller-integrated rotary electric machine according to Embodiment 1 of the present invention.

FIG. 2 is a circuit diagram of the controller-integrated rotary electric machine according to Embodiment 1 of the present invention. As shown in FIG. 2, in Embodiment 1, each of the power modules 21 has two serially-connected semiconductor switching elements and two diodes connected, respectively, antiparallel to the semiconductor switching elements, and these switching elements and the diodes are sealed with resin into one package.

The two semiconductor switching elements sealed in each power module 21 are connected in series, as described above. One of these semiconductor switching elements and the diode connected antiparallel thereto configure a positive pole-side arm corresponding to one phase of a 6-phase bridge circuit. The other semiconductor switching element and the diode connected antiparallel thereto configure a negative pole-side arm corresponding to one phase.

Each series connection point between the two semiconductor switching elements is connected to the stator winding 300 corresponding to one phase of a 6-phase stator winding. Therefore, the six power modules 21 configured as described above are connected respectively to terminals 22a that are connected to a B terminal 24 described hereinafter.

Figure 3:
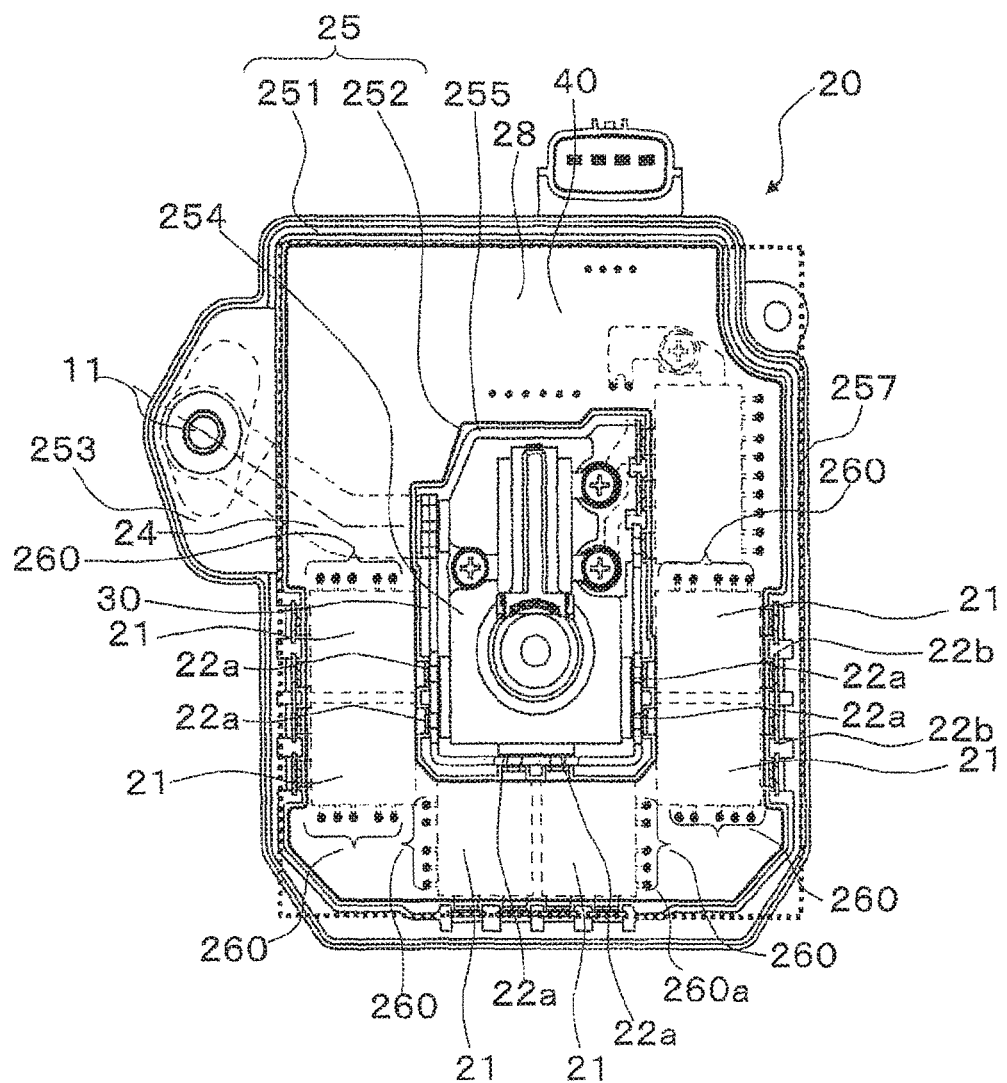
FIG. 3 is a partially broken side view of a rear, showing a configuration of a power circuit portion of the controller-integrated rotary electric machine according to Embodiment 1 of the present invention.

FIG. 3 is a partially broken side view of the rear, showing a configuration of the power circuit portion of the controller-integrated rotary electric machine according to Embodiment 1 of the present invention. As shown in FIG. 3, the power circuit portion 20 has the six power modules 21 configuring the 6-phase power conversion circuit and controlling conduction of the stator winding 300, the heat sink 23 on which these power modules 21 are mounted with insulating layers (not shown) therebetween, a positive-side power input/output terminal bolt 11 that is electrically connected to the positive side of the battery, the B terminal 24 and a B bus bar 30 that are electrically connected to the positive-side power input/output terminal bolt 11, and a power circuit case 25.

As shown in FIG. 1, the heat sink 23 is made of metal such as die-cast aluminum and has a through-hole 231 in the middle. On the front surface of the heat sink 23, multiple cooling fins 23a extending in an axial direction are formed integrally at the stator side of the rotary electric machine main body 102. The rotor shaft 6 passes through the through-hole 231 of the heat sink 23.

As shown in FIG. 3, the power circuit case 25 is made of resin and has an annular outer case portion 251 and an annular inner case portion 252. The inner case portion 252 has an inner wall 255 surrounding a through-hole 254 of the inner case portion 252. The inner wall 255 configures the inner wall of the power circuit case 25.

The power circuit case 25 is fixed to a rear-side front surface of the heat sink 23, thereby configuring a power module storage portion 257 surrounded by the outer case portion 251 and the inner case portion 252 of the power circuit case 25 and the rear-side front surface of the heat sink 23.

As shown in FIG. 3, the six power modules 21 described above are stored in the power module storage portion 257 and placed to form an opposite C-shape with spaces therebetween. In addition, control circuit board connectors 260 connected to the control circuit board 40 are inserted into the power module storage portion 257.

The control circuit board connectors 260 each apply a gate signal, which is sent from the control circuit of the control circuit board 40, to the gates of the semiconductor switching elements of each power module 21.

A power circuit waterproof resin 28 is packed in the power module storage portion 257 in which the power modules 21 and the control circuit board connectors 260 are stored. The power modules 21 and the control circuit board connectors 260, therefore, are embedded in the power circuit waterproof resin 28 and protected from water by the power circuit waterproof resin 28.

The B terminal 24, which functions as a terminal connected electrically to the positive electrode of the outside battery, is molded in the inner case portion 252 of the power circuit case 25 and a case coupling portion 253.

The B terminal 24 is electrically or mechanically connected to the terminals 22a of the six power modules 21 and terminals 260a of the control circuit board connectors 260 by welding or soldering. Note that the B terminal 24 is exposed on an upper surface of the case coupling portion 253 of the power circuit case 25.

The bus bar (referred to as "B bus bar" hereinafter) 30 connected electrically to the positive electrode of the outside battery is connected electrically to the positive-side power input/output terminal bolt 11 and fixed to the heat sink 23 through the power circuit case 25 configured as an insulating material.

Figure 4:
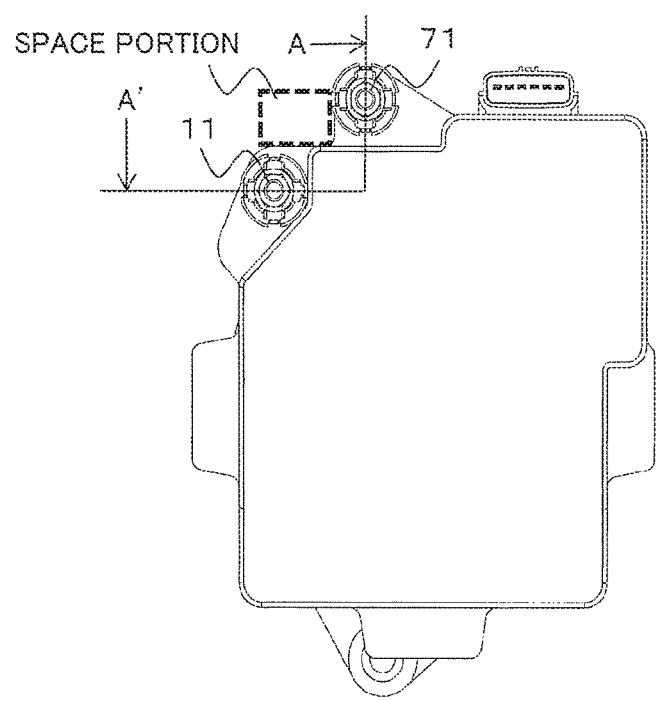
FIG. 4 is a front view of the controller-integrated rotary electric machine according to Embodiment 1 of the present invention.
Figure 5:
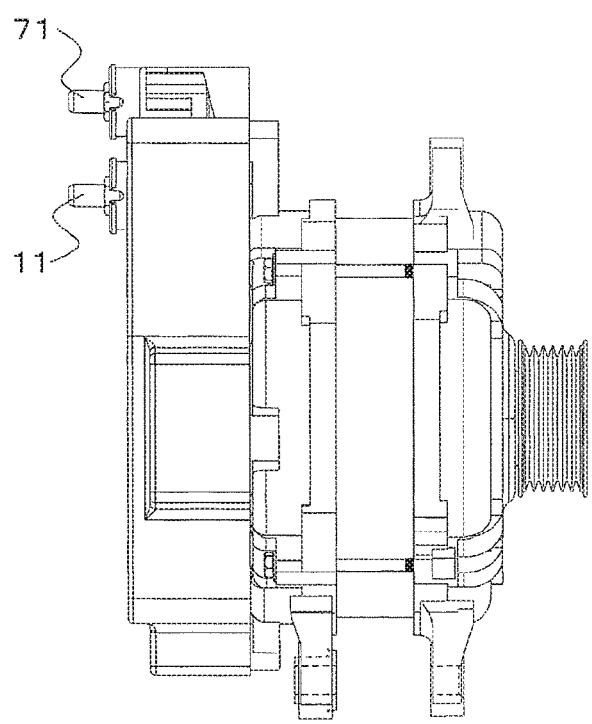
FIG. 5 is a side view of the controller-integrated rotary electric machine according to Embodiment 1 of the present invention.
Figure 6:
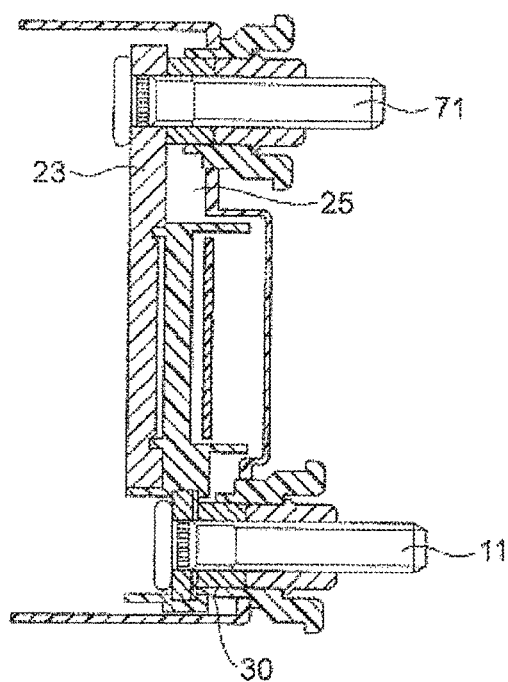
FIG. 6 is a cross-sectional diagram of the controller-integrated rotary electric machine according to Embodiment 1 of the present invention.

FIG. 4 is a front view of the controller-integrated rotary electric machine according to Embodiment 1 of the present invention. FIG. 5 is a side view of the controller-integrated rotary electric machine according to Embodiment 1 of the present invention. FIG. 6 is a cross-sectional diagram of the controller-integrated rotary electric machine according to Embodiment 1 of the present invention, taken along A-A' of FIG. 4.

The positive-side power input/output terminal bolt 11 and a negative-side power input/output terminal bolt 71 are in a positional relation shown in FIGS. 4 and 5. As shown in FIG. 6, the negative-side power input/output terminal bolt 71 is fixed directly to the heat sink 23, whereas the positive-side power input/output terminal bolt 11 is fixed to the heat sink 23 through the power circuit case 25 configured as an insulating material.

In the controller-integrated rotary electric machine 100 according to Embodiment 1 of the present invention having the foregoing configuration, the positive-side power input/output terminal bolt 11 is electrically connected to the positive side of the battery provided on the outside of the controller-integrated rotary electric machine 100, through a battery harness or the like (not shown).

The pulley 12 is coupled, through a belt, to a pulley on an internal combustion engine (not shown) that is provided at the output shaft of the internal combustion engine.

When the controller-integrated rotary electric machine 100 is operated as a motor, the power conversion circuit configured by the power modules 21 is operated as an inverter. Specifically, by having the semiconductor switching elements of the power modules 21 switch-controlled with a gate signal from the control circuit provided in the control circuit board 40, the power conversion circuit is operated as an inverter.

Consequently, direct current power is input from the battery to the terminals 22a of the power modules 21 through the positive-side power input/output terminal bolt 11, the B terminal 24, and the B bus bar 30. The input direct current power is converted into 6-phase alternating current power by the inverter configured by the power modules 21. Furthermore, the resultant 6-phase alternating current power is supplied to the winding of each of the phases of the 6-phase stator winding 300 through terminals 22b of the power modules 21.

As a result, the rotor 13 is driven by the interaction between a rotating magnetic field generated by the stator winding 300 and a magnetic field generated by the rotor winding (field winding) 7 provided in the rotor 13. Furthermore, driving the rotor 13 transmits power from the pulley 12 to the internal combustion engine through the belt.

When, on the other hand, the controller-integrated rotary electric machine 100 is operated as a generator, the power of the internal combustion engine is transmitted to the pulley 12 through the belt to drive the rotor 13. In this case, the power conversion circuit configured by the power modules 21 is operated as a converter.

Specifically, by having the semiconductor switching elements of the power modules 21 switch-controlled with a gate signal from the control circuit provided in the control circuit board 40, the power conversion circuit is operated as a converter.

The alternating current power induced by each phase winding of the stator winding 300 is applied to each of the power modules 21 via the terminals 22b of the power modules 21. As a result, the alternating current power is converted into direct current power by the converter configured with the power modules 21. In addition, the resultant direct current power is supplied from the terminals 22a of the power modules 21 to the battery via the B bus bar 30, the B terminal 24, a spacer 42, and a nut 36.

In the controller-integrated rotary electric machine 100 according to Embodiment 1 of the present invention, the positive-side power input/output terminal and the negative-side power input/output terminal each have a fixed structure fixed to the same single heat sink, as described above. Therefore, vibration resistance can be ensured.

The cooling efficiency of these terminals can be improved due to the presence of these fixed structures. Therefore, thermal expansion or thermal compression does not occur easily on the nut 36 during a heat cycle, preventing loosening of the nut 36.

In addition, the controller-integrated rotary electric machine 100 according to Embodiment 1 of the present invention has a space portion formed between the positive-side power input/output terminal and the negative-side power input/output terminal, as shown in FIG. 4. Therefore, even when the controller-integrated rotary electric machine 100 is submerged, insulation thereof can always be ensured without having water pooling therein.

Therefore, when the controller-integrated rotary electric machine needs to have higher voltage (e.g., approximately 50 V), the foregoing configuration can eliminate the possibility of electrical shock to a human who disconnects the rotary electric machine to conduct vehicle maintenance.

The presence of such a space portion allows the positive-side power input/output terminal bolt or a positive-side power supply harness on the vehicle side to fall into the space portion upon collision of the vehicle. Consequently, the positive-side power input/output terminal bolt or the positive-side power supply harness on the vehicle side does not short-circuit with the negative-side power input/output terminal bolt, preventing destruction by fire and achieving a beneficial effect on collision safety.

As described above, Embodiment 1 provides the configuration in which the positive-side power input/output terminal and the negative-side power input/output terminal are fixed to a single heat sink. Embodiment 1, therefore, can realize a controller-integrated rotary electric machine capable of ensuring vibration resistance.

Embodiment 1 also provides the configuration in which the space portion is formed between the positive-side power input/output terminal bolt and the negative-side power input/output terminal bolt. Therefore, even when the controller-integrated rotary electric machine is submerged, the controller-integrated rotary electric machine can always ensure insulation without having water pooling therein.

Moreover, the presence of such a space portion prevents not only short circuit between the positive side and the negative side but also destruction by fire even upon collision of the vehicle, contributing to the improvement collision safety.

Embodiment 2

Figure 7:
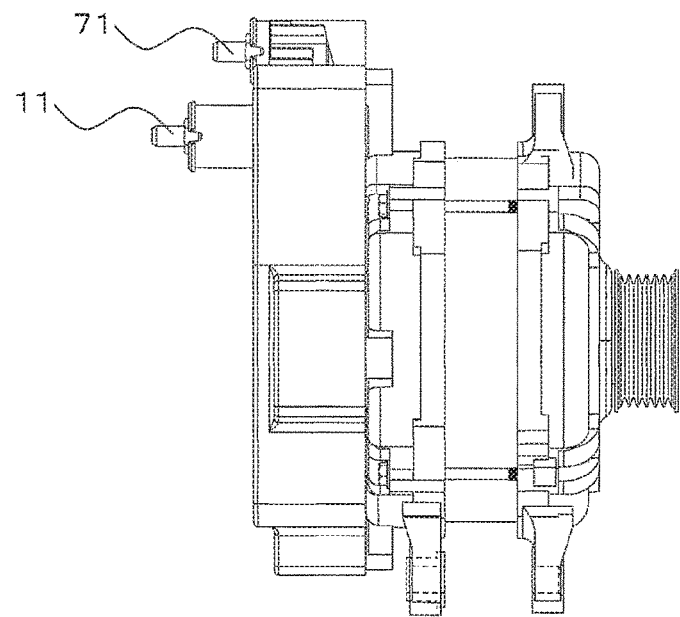
FIG. 7 is a side view of a controller-integrated rotary electric machine according to Embodiment 2 of the present invention.

FIG. 7 is a side view of a controller-integrated rotary electric machine according to Embodiment 2 of the present invention. As shown in FIG. 7, unlike the configuration shown in FIG. 5 according to Embodiment 1 described above, a controller-integrated rotary electric machine 100 according to Embodiment 2 of the present invention has the positive-side power input/output terminal bolt 11 placed at the rear side.

As a result of placing the positive-side power input/output terminal bolt 11, the positive-side power input/output terminal bolt 11 and the negative-side power input/output terminal bolt 71 can be separated from each other in the axial direction of the rotor shaft of the rotary electric machine. As a result, insulation between the positive side and the negative side can be ensured even upon entry of foreign substances.

As described above, Embodiment 2 further has the configuration in which the positive-side power input/output terminal and the negative-side power input/output terminal are separated in the axial direction. The configuration of Embodiment 2 can therefore realize a controller-integrated rotary electric machine with more improved insulation.

Embodiment 3

Figure 8:
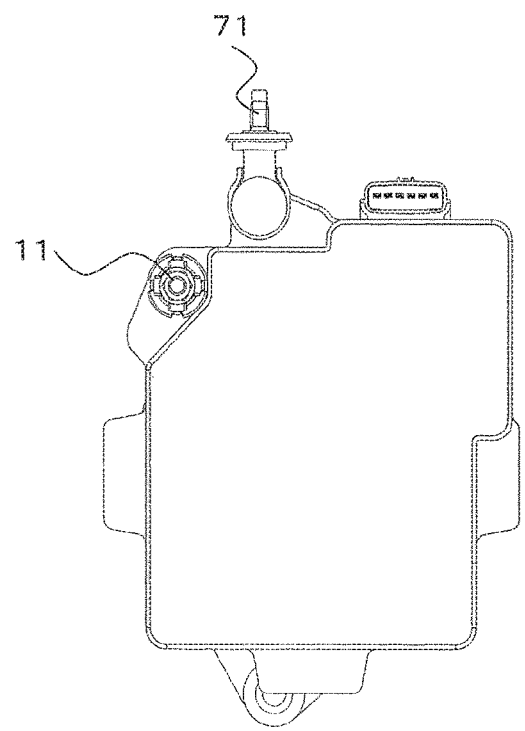
FIG. 8 is a front view of a controller-integrated rotary electric machine according to Embodiment 3 of the present invention.
Figure 9:
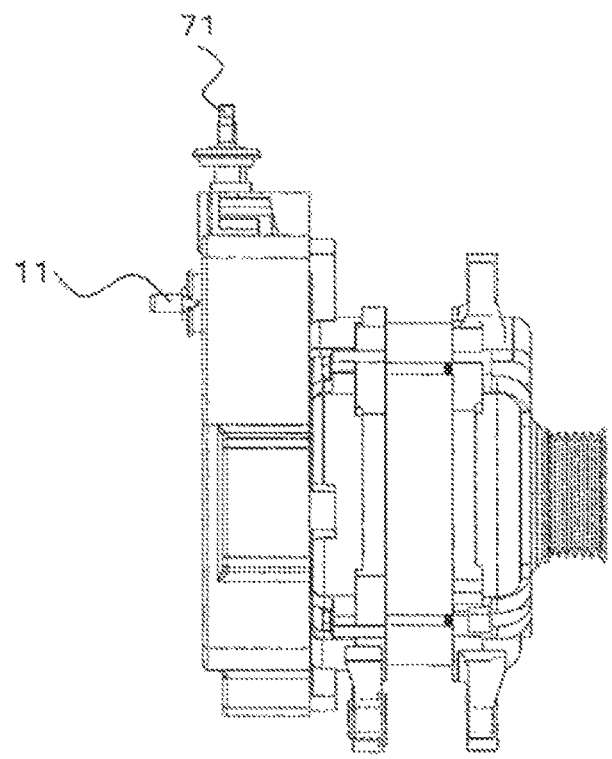
FIG. 9 is a side view of the controller-integrated rotary electric machine according to Embodiment 3 of the present invention.

FIG. 8 is a front view of a controller-integrated rotary electric machine according to Embodiment 3 of the present invention. FIG. 9 is a side view of the controller-integrated rotary electric machine according to Embodiment 3 of the present invention.

A controller-integrated rotary electric machine 100 according to Embodiment 3 of the present invention has the positive-side power input/output terminal bolt 11 extended in the axial direction and the negative-side power input/output terminal bolt 71 extended in the radial direction of the rotary electric machine. In this arrangement as well, the positive-side power input/output terminal bolt 11 and the negative-side power input/output terminal bolt 71 are separated from each other in the radial direction. Therefore, as with the arrangement described in Embodiment 2, the configuration of Embodiment 3 can ensure insulation against entry of foreign substances.

Although not shown, the same effects as the arrangement shown in FIGS. 8 and 9 can be achieved with an arrangement different from that shown in FIGS. 8 and 9, in which the positive-side power input/output terminal bolt 11 is extended in the radial direction and the negative-side power input/output terminal bolt 71 is extended in the axial direction.

As described above, Embodiment 3 has the configuration in which the positive-side power input/output terminal and the negative-side power input/output terminal are extended in different directions and separated from each other. Therefore, as with Embodiment 2, the configuration of Embodiment 3 can realize a controller-integrated rotary electric machine with more improved insulation.

Embodiment 4

Figure 10:
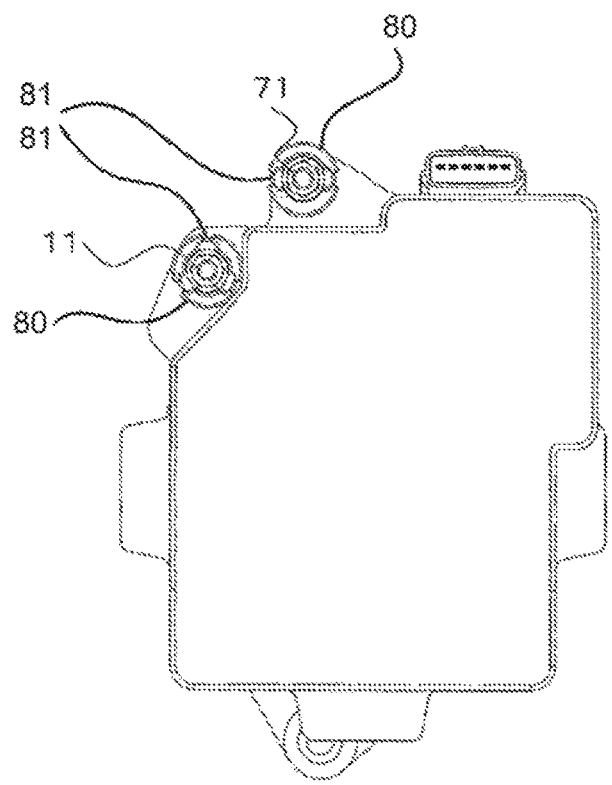
FIG. 10 is a front view of a controller-integrated rotary electric machine according to Embodiment 4 of the present invention.
Figure 11:
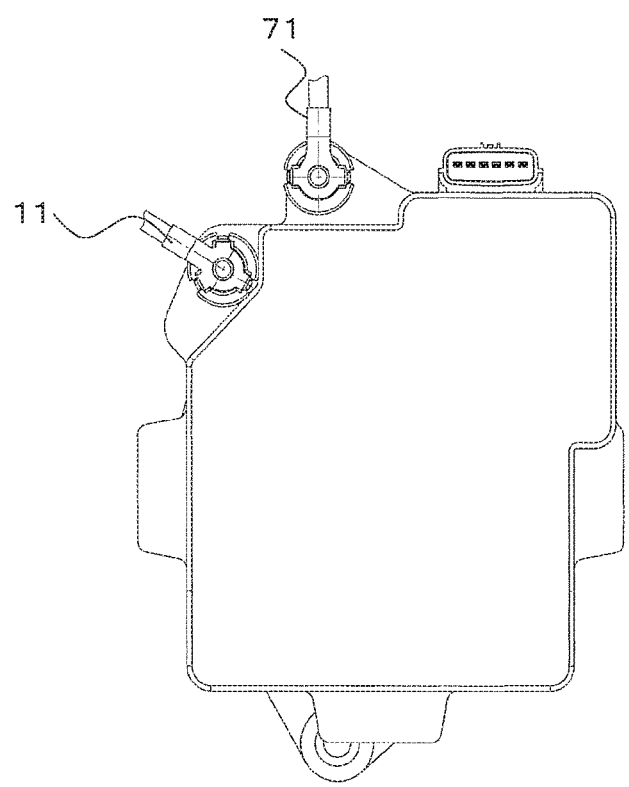
FIG. 11 is a front view showing a harness installed in the controller-integrated rotary electric machine according to Embodiment 4 of the present invention.

FIG. 10 is a front view of a controller-integrated rotary electric machine according to Embodiment 4. FIG. 11 is a front view showing a harness installed in the controller-integrated rotary electric machine according to Embodiment 4 of the present invention.

A harness mount 80 of the positive-side power input/output terminal is provided with an odd number of depressions 81 that are arranged at approximately equal intervals. On the other hand, a harness mount 80 of the negative-side power input/output terminal is provided with an even number of depressions 81 that are arranged at approximately equal intervals. In the examples shown in FIGS. 10 and 11, the harness mount 80 of the positive-side power input/output terminal is provided with three depressions 81, and the harness mount 80 of the negative-side power input/output terminal is provided with two depressions 81.

With these different installation structures of the both terminals, improper mechanical assembly therebetween can be prevented from occurring in market maintenance, preventing reverse connection of the battery. Consequently, smoke emission and ignition can be prevented beforehand.

Although not shown, the same effects as those of the configuration shown in FIGS. 10 and 11 can be achieved by creating a configuration different from that shown in FIGS. 10 and 11, in which the harness mount 80 of the positive-side power input/output terminal is provided with an even number of depressions 81 that are arranged at approximately equal intervals and the harness mount 80 of the negative-side power input/output is provided with an odd number of depressions 81 that are arranged at approximately equal intervals.

According to such a configuration in which the harness mounts 80 are each provided with depressions 81 arranged at approximately equal intervals, the tightening torque generated by attaching the harnesses can act substantially evenly on the depressions 81, preventing damage to the depressions 81.

According to Embodiment 4, as described above, the number of depressions 81 provided is different between the harness mounts 80 of the positive-side power input/output terminal and the negative-side power input/output terminal, and the depressions 81 are arranged at approximately equal intervals. The configuration of Embodiment 4, therefore, can prevent reverse connection of the battery and damage to the depressions 81 that could be caused by the tightening torque.

What is claimed is:

1. A controller-integrated rotary electric machine having a power circuit portion provided between an external power source and a stator winding of a rotary electric machine main body, wherein the power circuit portion includes:
   a positive-side power input/output terminal and a negative-side power input/output terminal that are electrically connected to the external power source;
   a power module that is connected to the external power source by the positive-side power input/output terminal and the negative-side power input/output terminal, is also connected to the stator winding, and performs power conversion between the external power source and the stator winding; and
   a single heat sink that cools the power module,
   the positive-side power input/output terminal being fixed to the single heat sink via an insulating material, and
   the negative-side power input/output terminal being fixed directly to the single heat sink, wherein
   either one of the positive-side power input/output terminal and the negative-side power input/output terminal is attached to a harness mount provided with an even number of depressions arranged at approximately equal intervals, and
   the other one of the terminals is attached to a harness mount provided with an odd number of depressions arranged at approximately equal intervals, the odd number of depressions being three or more.

2. The controller-integrated rotary electric machine according to claim 1, wherein the positive-side power input/ output terminal and the negative-side power input/output terminal are placed separately from each other with a space portion therebetween.

3. The controller-integrated rotary electric machine according to claim 2, wherein a seating surface position for a harness mount of the positive-side power input/output terminal and a seating surface position for a harness mount of the negative-side power input/output terminal are separated from each other in an axial direction with the space portion therebetween.

4. The controller-integrated rotary electric machine according to claim 2, wherein a seating surface position for a harness mount of the positive-side power input/output terminal and a seating surface position for a harness mount of the negative-side power input/output terminal are separated from each other in a radial direction with the space portion therebetween.

5. The controller-integrated rotary electric machine according to claim 2, wherein either one of the positive-side power input/output terminal and the negative-side power input/output terminal extends in an axial direction of the rotary electric machine, and the other one of the positive-side power input/output terminal and the negative-side power input/output terminal extends in a radial direction of the rotary electric machine.

6. A controller-integrated rotary electric machine having a power circuit portion provided between an external power source and a stator winding of a rotary electric machine main body, wherein the power circuit portion includes:
  a positive-side power input/output terminal and a negative-side power input/output terminal that are electrically connected to the external power source;
  a power module that is connected to the external power source by the positive-side power input/output terminal and the negative-side power input/output terminal, is also connected to the stator winding, and performs power conversion between the external power source and the stator winding; and
  a single heat sink that cools the power module,
  the positive-side power input/output terminal being fixed to the single heat sink via an insulating material, and
  the negative-side power input/output terminal being fixed directly to the single heat sink,
  wherein either one of the positive-side power input/output terminal and the negative-side power input/output terminal protrudes in an axial direction of the rotary electric machine, and the other one of the positive-side power input/output terminal and the negative-side power input/output terminal protrudes in a radial direction of the rotary electric machine.

7. A controller-integrated rotary electric machine having a power circuit portion provided between an external power source and a stator winding of a rotary electric machine main body, wherein the power circuit portion includes:
  a positive-side power input/output terminal and a negative-side power input/output terminal that are electrically connected to the external power source;
  a power module that is connected to the external power source by the positive-side power input/output terminal and the negative-side power input/output terminal, is also connected to the stator winding, and performs power conversion between the external power source and the stator winding; and
  a single heat sink that cools the power module,
  the positive-side power input/output terminal being fixed to the single heat sink via an insulating material, and
  the negative-side power input/output terminal being fixed directly to the single heat sink,
  wherein the positive-side power input/output terminal protrudes in a direction orthogonal to a direction of protrusion of the negative-side power input/output terminal.

* * * * *